United States Patent
Hong et al.

(10) Patent No.: US 11,206,212 B2
(45) Date of Patent: Dec. 21, 2021

(54) DISAMBIGUATING TRAFFIC IN NETWORKING ENVIRONMENTS WITH MULTIPLE VIRTUAL ROUTING AND FORWARDING (VRF) LOGICAL ROUTERS

(71) Applicant: VMware, Inc., Palo Alto, CA (US)

(72) Inventors: Xinhua Hong, Campbell, CA (US); Yong Wang, San Jose, CA (US); Jia Yu, Sunnyvale, CA (US); Dexiang Wang, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 80 days.

(21) Appl. No.: 16/715,247

(22) Filed: Dec. 16, 2019

(65) Prior Publication Data

US 2021/0184970 A1    Jun. 17, 2021

(51) Int. Cl.
*H04L 12/713* (2013.01)
*H04L 12/66* (2006.01)
*H04L 12/46* (2006.01)
*H04L 12/931* (2013.01)
*H04L 12/751* (2013.01)
*H04L 12/715* (2013.01)

(52) U.S. Cl.
CPC ........ *H04L 45/586* (2013.01); *H04L 12/4645* (2013.01); *H04L 12/66* (2013.01); *H04L 45/02* (2013.01); *H04L 45/64* (2013.01); *H04L 49/354* (2013.01); *H04L 12/4633* (2013.01)

(58) Field of Classification Search
CPC ....... H04L 45/586; H04L 45/02; H04L 45/64; H04L 12/4645; H04L 12/66; H04L 49/354
See application file for complete search history.

(56) References Cited

U.S. PATENT DOCUMENTS

| | | | |
|---|---|---|---|
| 10,057,162 B1* | 8/2018 | Singh | H04L 45/66 |
| 10,581,738 B2* | 3/2020 | Indiresan | H04L 45/745 |
| 2007/0058638 A1* | 3/2007 | Guichard | H04L 45/50 370/395.31 |
| 2010/0232435 A1* | 9/2010 | Jabr | H04L 12/4645 370/392 |
| 2010/0329265 A1* | 12/2010 | Lapuh | H04L 45/00 370/395.53 |
| 2016/0134520 A1* | 5/2016 | Kapadia | H04L 45/54 370/392 |
| 2017/0288903 A1* | 10/2017 | Santhanam | H04L 69/03 |

\* cited by examiner

*Primary Examiner* — Min Jung

(74) *Attorney, Agent, or Firm* — Patterson & Sheridan, LLP

(57) ABSTRACT

The disclosure provides an approach for routing traffic in a network. Embodiments include receiving, by a service router of an edge services gateway (ESG), a packet comprising a virtual network identifier (VNI) and a virtual local area network (VLAN) identifier. Embodiments include sending, by the service router, the packet to a virtual switch of the ESG based on the VNI of the packet. Embodiments include determining, by the virtual switch, a virtual routing and forwarding (VRF) router of the ESG for the packet based on the VLAN identifier. Embodiments include forwarding, by the virtual switch, the packet to the VRF router.

20 Claims, 4 Drawing Sheets

| VNI | VLAN ID | VRF |
|---|---|---|
| VNI1 | VLAN1 | 144 |
| VNI1 | VLAN2 | 146 |
| VNI2 | VLAN1 | 148 |

DISAMBIGUATING TRAFFIC IN NETWORKING ENVIRONMENTS WITH MULTIPLE VIRTUAL ROUTING AND FORWARDING (VRF) LOGICAL ROUTERS

BACKGROUND

Software defined networking (SDN) comprises a plurality of hosts in communication over a physical network infrastructure of a data center (e.g., on-premise data center or a cloud data center), each host having one or more virtualized endpoints such as virtual machines (VMs), containers, or other virtual computing instances (VCIs). These VCIs may be connected across the multiple hosts in a manner that is decoupled from the underlying physical network infrastructure. In one example, the VCIs may be connected to logical overlay networks that may span multiple hosts and are decoupled from the underlying physical network infrastructure.

SDN involves the use of a management plane (MP) and a control plane (CP). The management plane is responsible for receiving network configuration input from, for example, an administrator and generating desired state data that specifies how the logical network should be implemented in the physical infrastructure. The control plane is responsible for determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain.

For example, the VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

VTEP services may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

It should be noted that the term VTEP originally referred to a "VXLAN tunneling endpoint" and VNI referred to a "VXLAN network identifier." However, while originally the terms "VTEP" and "VNI" referred to "VXLAN" tunneling protocol, they are now often used regardless of the tunneling protocol, and therefore referred to herein as a "virtual" instead. This "backronym" can be misleading as the tunnel is not itself virtual, but does carry logical overlay networking traffic, which is sometimes referred to as virtual network traffic.

A VLAN is a broadcast domain that is partitioned and isolated at Layer 2. Accordingly, VLANs can be used to segment a Layer 2 network to separate traffic between different VLANs. For example, different VMs may be assigned different VLAN IDs corresponding to different VLANs.

Virtual routing and forwarding (VRF) generally allows multiple instances of a routing table to exist in a single router, such as a virtual router implementing a logical router at a host, and to be used simultaneously. A VRF instance is essentially a logical router, and may be referred to as such. However, while a conventional logical router may include multiple routing tables, a VRF logical router utilizes only a single routing table (e.g., a VRF table). Using multiple VRF logical routers allows network paths to be segmented without requiring the use of multiple devices.

In some cases, multiple VRF logical routers may be implemented within a single virtual router. A host may further implement multiple logical switches, each associated with a different VNI, as multiple virtual switches. Further, each virtual switch may be coupled to one or more VRF logical routers in the virtual router. In such cases, it can be difficult to disambiguate to which VRF traffic received at a virtual switch should be sent for routing based solely on VNI, as the VNI only indicates a logical switch and not a specific VRF logical router associated with the logical switch.

SUMMARY

Embodiments provide a method of routing traffic in a network. Embodiments include: receiving, by a service router of an edge services gateway (ESG), a packet comprising a virtual network identifier (VNI) and a virtual local area network (VLAN) identifier; sending, by the service router, the packet to a virtual switch of the ESG based on the VNI of the packet; determining, by the virtual switch, a virtual routing and forwarding (VRF) router of the ESG for the packet based on the VLAN identifier; and forwarding, by the virtual switch, the packet to the VRF router Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIG. 2 depicts an example forwarding table according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
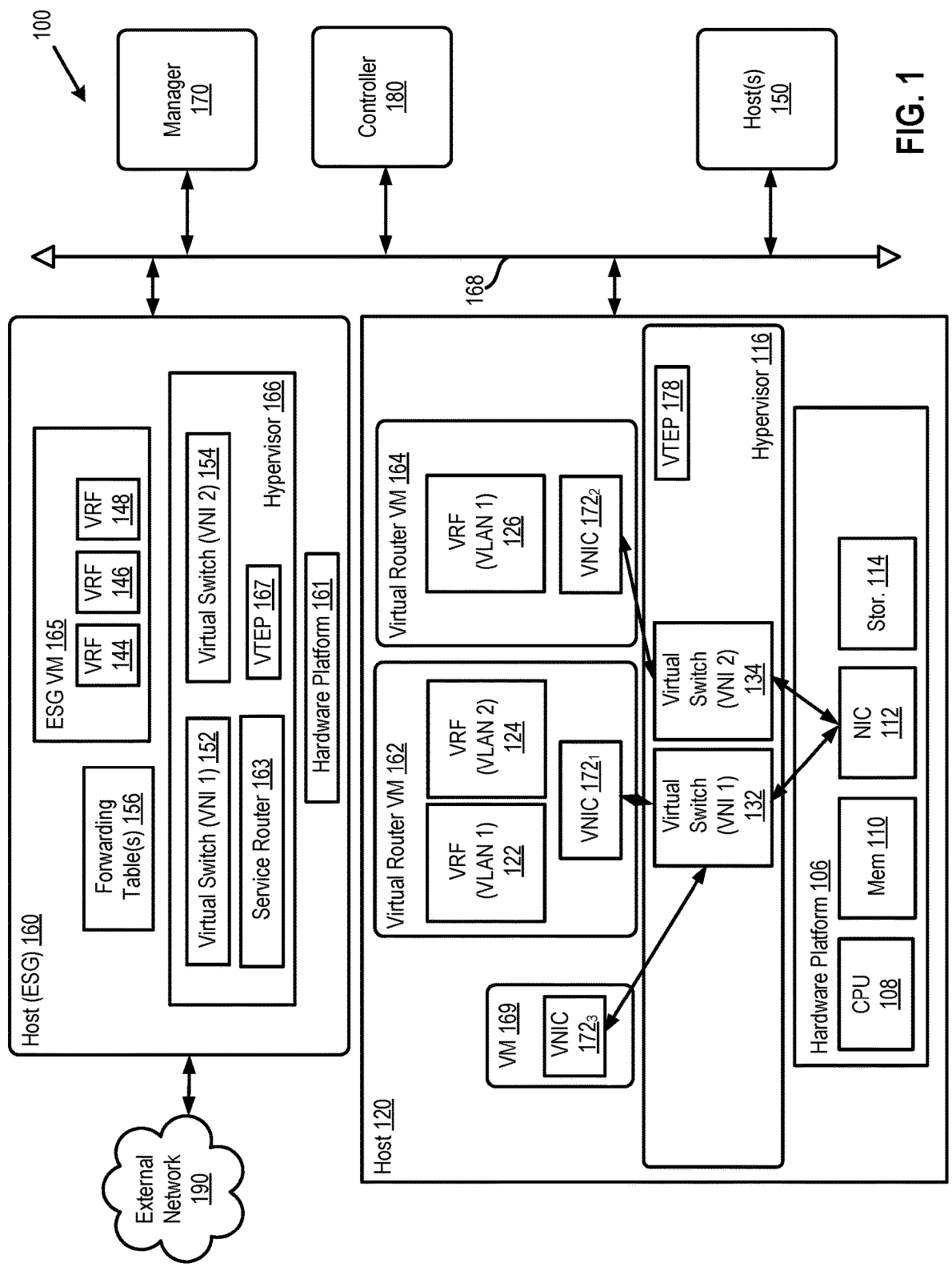
FIG. 1 depicts a block diagram of physical and virtual components of a networking environment in which one or more embodiments of the present disclosure may be utilized.

The present disclosure provides an approach for routing traffic in a networking environment with multiple virtual routing and forwarding (VRF) logical routers coupled to one or more logical switches. In some examples, a virtual router may have separate VRF logical routers with separate VRF tables for different tenants. Furthermore, multiple virtual routers may each be associated with different virtual switches that have different virtual network identifiers (VNIs). As such, it may be difficult to differentiate traffic arriving at an edge services gateway (ESG) from VMs corresponding to different VRF logical routers.

In certain embodiments, an "incoming label switch" technique is used, for example at an edge services gateway (ESG), in order to disambiguate traffic based on a combination of a VNI and VLAN identifier that corresponds to a VRF logical router. The use of the VLAN identifier in such embodiments may be an overloaded use of the VLAN identifier, and not a standard use of the VLAN identifier as described in the Background herein.

In an example, a virtual router of a logical network receives a packet from a VM. The virtual router determines which of a plurality of VRF logical routers implemented on the virtual router corresponds to the packet, such as based on a source internet protocol (IP) address of the packet. For example, the virtual router may access a table that maps source IP addresses to VRF logical routers. In some embodiments, the table alternatively or also includes a VLAN identifier for each VRF logical router. The virtual router encapsulates the packet with an inner header that includes the VLAN identifier for the VRF logical router to which the packet corresponds (e.g., the VRF logical router to which the source VM of the packet corresponds). The VRF logical router to which the packet corresponds is then used to determine forwarding information for the packet. The virtual router sends the packet, via a virtual switch to which the packet corresponds, to a VTEP, which encapsulates the packet with an outer header (e.g., a GENEVE header) that includes a VNI of the logical switch to which the packet corresponds. The VTEP then forwards the packet to its next hop, which may be a VTEP on a host of an ESG.

In some embodiments, a service router at the ESG receives the packet and determines a virtual switch of the ESG to which to forward the packet based on the VNI indicated in the packet's outer header. The service router, or a VTEP associated with the service router, decapsulates the packet by removing the outer header and forwards the packet to the appropriate virtual switch. The virtual switch determines which VRF logical router to which the packet corresponds based on the VLAN identifier in the packet's inner header. In some embodiments, the virtual switch decapsulates the packet by removing the inner header, and then forwards the packet to the identified VRF logical router. For instance, each VNI/VLAN identifier combination may be assigned to a different VRF logical router in one or more forwarding tables at the ESG, thereby differentiating between traffic arriving at the ESG from different VRF logical routers of different virtual switches. In some embodiments, each VRF logical router is implemented as a separate port of a logical router at the ESG. In certain embodiments, the VRF logical router receives the packet and forwards it to its next hop, which may be an uplink port by which the packet is transmitted to a separate logical or physical network.

FIG. 1 is a block diagram depicting physical and virtual components of a networking environment 100, in which one or more embodiments of the present disclosure may be utilized.

Network 100 includes host 120, host (ESG) 160, and host(s) 150, which may be representative of a plurality of hosts that are communicatively connected to a physical or "underlay" network. As used herein, the term "underlay" is synonymous with "physical" and refers to physical components of network 100. As used herein, the term "overlay" is used synonymously with "logical" and refers to the logical network implemented at least partially within network 100.

Network 100 includes a controller 180 that collects and distributes information about the network from and to endpoints in the network. Controller 180 communicates with host 120, host (ESG) 160, and host(s) 150 via management network 168, such as through control plane protocols.

Network 100 includes a management component, depicted in FIG. 1 as manager 170, that may communicate with host 120, host (ESG) 160, and host(s) 150 via management network 168, such as via controller 180. In one embodiment, manager 170 is a computer program or a plurality of programs that executes in one or more central servers in network 100, or alternatively, manager 170 may run in one or more VMs, e.g. in host 120. Manager 170, as described herein, may comprise both management and control planes, and is configured to carry out administrative tasks for network 100, including managing host 120, host (ESG) 160, and host(s) 150, managing VCIs running within hosts, provisioning VCIs, transferring VCIs from one host to another host, transferring VCIs from network 100 to another network or data center (not shown), and load balancing between hosts, and between network 100 and other networks. In certain embodiments manager 170 receives configuration information from an administrator and pushes the configuration information as control data to host 120, host (ESG) 160, and host(s) 150 via controller 180. The configuration data may include, for example, data stored in VRF tables and/or forwarding table(s) 156.

Host 120 may be constructed on a server grade hardware platform 106, such as an x86 architecture platform. Hardware platform 106 includes one or more processors (CPUs) 108, system memory 110, a physical network interface 112, and a storage system 114. CPU 108 is configured to execute instructions, for example, executable instructions that perform one or more operations described herein and may be stored in memory 110 and in local storage 114. Physical network interface 112 enables host 120 to communicate with another device (e.g., other hardware computing platforms, entities, or host machines) via a communication medium, such as via network 100 and/or external networks such as external network 190. Network interface 112 may be one or more network adapters, also sometimes referred to as Network Interface Cards (NICs).

VCIs, such as virtual router VMs 162 and 164 and VM 169, run on top of a software interface layer, referred to herein as a hypervisor 116, that enables sharing of the hardware resources of host 120 by the VCIs. Hypervisor 116 may run on top of the operating system of host 120 or directly on hardware components of host 120.

Hypervisor 116 includes virtual switches 132 and 134, each of which serves as an interface between the VCIs hosted on host 120, NIC 112, as well as other physical resources available on exemplary host machine 120. Each of virtual switches 132 and 134 corresponds to a different VNI. Hypervisor 116 further includes a hypervisor-based virtual tunnel endpoint (VTEP) 178, which may be implemented in software by virtual switches 132 and/or 134 (or outside of a virtual switch and functionally coupled to the virtual switch using forwarding tables).

In alternate embodiments, virtual switches 132 and/or 134, VTEP 178, and/or physical device drivers may execute in a privileged virtual machine often referred to as a "Domain zero", "root-", or "parent-partition." Each of the VCIs (virtual router VMs 162 and 164 and VM 169) includes a virtual network interface card (VNIC) 172, which is responsible for exchanging packets between the VCI and hypervisor 116. VNICs 172 may be, in some cases, a software abstraction of a physical network interface card. Each VCI is connected via a VNIC 172 to a virtual switch 132 or 134, and virtual switches 132 and 134 are connected to physical network interface 112 to allow network traffic to be exchanged between VCIs executing on host machine 120 and other network destinations such as VCIs hosted by other host machines inside and outside of network 100. In alternative embodiments, some or all of VNICs 172 may be connected to virtual switch 132 and/or 134. For example, VNIC 172₁ may be connected to virtual switch 132 and VNIC 172₂ may be connected to virtual switch 134.

Although certain embodiments are described herein with respect to VMs, the same principals and techniques may also apply to other appropriate virtual computing instances (e.g., containers (e.g., Docker containers), data compute nodes, isolated user space instances, namespace containers, etc.).

Virtual router VMs 162 and 164 generally represent VCIs that performs logical routing functions using VRF tables of VRFs 122, 124, and 126. VRFs 122, 124, and 126 generally represent separate VRF logical routers. In an embodiment, virtual router VM 162 corresponds to virtual switch 132 and virtual router VM 164 corresponds to virtual switch 134.

Host (ESG) 160 comprises ESG VM 165, which is configured to operate as a gateway device. A gateway device provides VCIs in a logical network with connectivity to one or more networks that are external to network 100 (e.g., a direct link, a local area network (LAN), a wide area network (WAN) such as the Internet, another type of network, or a combination of these). As shown in FIG. 1, ESG VM 165 provides connectivity to external network 190, which is a network outside of network 100. In certain embodiments, external network 190 represents a separate logical network, a separate physical network, a separate data center, or another network that is separate from network 100. For example, the gateway device may manage external public IP addresses for VCIs in network 100 and route traffic incoming to network 100 from external network 190 and outgoing from network 100 to external network 190. The gateway device also provides other networking services, such as firewalls, network address translation (NAT), dynamic host configuration protocol (DHCP), and load balancing. In the example of FIG. 1, the gateway device is implemented as a VCI (e.g., VM), that is configured to execute on host 160.

As shown, ESG VM 165 comprises VRFs 144, 146, and 148. For instance, VRFs 144, 146, and 148 may route packets received by ESG VM 165 to intended destinations inside and outside of network 100, such as to and from host 120 and host(s) 150 and external network 190. In one embodiment, VRF 144 corresponds to (e.g., uses the same VRF table as) VRF 122, VRF 146 corresponds to VRF 124, and VRF 148 corresponds to VRF 126.

Host (ESG) 160 includes hardware platform 161, which may be similar to hardware platform 106, and hypervisor 166, which may be similar to hypervisor 116. Hypervisor 166 includes virtual switches 152 and 154 and VTEP 167, which may be similar to virtual switches 132 and 134 and VTEP 178. Hypervisor 166 further includes a service router 163, which serves as a generic logical router for hypervisor 166 that receives all incoming packets and routes them to an appropriate virtual switch. For example, service router 163 may determine which of virtual switches 152 or 154 to which to route a given incoming packet based on a VNI indicated in an outer header of the incoming packet. Each of virtual switches 152 and 154 may use forwarding table(s) 156 to determine a VRF of VRFs 144, 146, and 148 to which to route an incoming packet based on the VNI associated with the virtual switch and a VLAN identifier in an inner header of the incoming packet. Forwarding table(s) 156 generally include mappings between VNIs, VLAN identifiers, and VRFs, as described in more detail below with respect to FIG. 2.

In one example, virtual router VM 162 receives a packet from VM 169. For example, the packet may have been routed to virtual router VM 162 by virtual switch 132 based on a next hop MAC address for the packet, which virtual switch 132 may have determined using forwarding tables based on the destination IP address of the packet originated at VM 169. Virtual router VM 162 determines which VRF corresponds to the packet based on a source IP address of the packet (e.g., based on mapping information that maps an IP address of VM 169 to one of VRFs 122 or 124). In certain embodiments, virtual router VM 162 encapsulates the packet with an inner header including a VLAN identifier that corresponds to the VRF of the packet (e.g., based on mapping information that maps VRFs to VLAN identifiers). In an alternative embodiment, virtual router VM 162 modifies an existing inner header of the packet to include the VLAN identifier. In one example, the VRF of the packet is VRF 122, and the packet is encapsulated with an inner header including the VLAN identifier of "VLAN 1". VRF 122 is then used to determine forwarding information for the packet, and the packet is forwarded via virtual switch 132 to VTEP 178. For example, the packet may be routed by setting a next hop MAC address of the packet based on VRF 122. Each successive hop (e.g., virtual switch 132 to VTEP 178) may be determined based on a destination IP address of the packet using forwarding tables. VTEP 178 encapsulates the packet with an outer header that includes a VNI corresponding to the virtual switch 132 (e.g., "VNI 1"). The packet is then forwarded via VTEP 167 to service router 163 on host 160. For example, VTEP 178 may route the packet to VTEP 167 by setting a destination IP address of the outer header to VTEP 167/host (ESG) 160, and VTEP 167 may route the packet to service router 163 by setting a next hop MAC address in the inner header. In an example, virtual switch 132 sends the packet from VTEP 178 to host (ESG) 160 based on the destination IP address of the outer header using NIC 112, and the packet is received on host (ESG) 160 by VTEP 167, which routes the packet to service router 163.

In some embodiments, service router 163 determines which virtual switch 152 or 154 to which to send the packet based on the VNI in the outer header of the packet. VTEP 167, which is associated with service router 163, decapsulates the packet by removing the outer header, and service router 163 forwards the decapsulated packet to the determined virtual switch by setting a next hop MAC address for the packet. In an example, service router 163 sends the packet to virtual switch 152. Virtual switch 152 then uses forwarding table(s) 156 to determine which VRF 144, 146, or 148 to which it should forward the packet based on the VLAN identifier in the inner header of the packet. For example, forwarding table(s) 156 may include mappings between VNIs, VLAN identifiers, and VRFs. In alternative embodiments, each given virtual switch 152 and 154 has its own separate forwarding table 156, which includes mappings between VLAN identifiers and VRFs for the specific VNI of the given virtual switch. In an example, virtual switch 152 decapsulates the packet by removing the inner header and forwards the packet to VRF 144 of ESG VM 165 by setting a next hop MAC address for the packet. VRF 144 then forwards the packet to its next hop, which may, for example, be an uplink port by which ESG VM 165 sends packets to destinations on external network 190. FIG. 2 depicts an example forwarding table 156 according to embodiments of the present disclosure. For instance, forwarding table 156 may be associated with ESG VM 165 of FIG. 1.

Forwarding table 156 includes mappings of VNIs and VLAN identifiers to VRFs. For example, the combination of "VNI1" and "VLAN1" is mapped to VRF "144", the combination of "VNI1" and "VLAN2" is mapped to VRF "146", and the combination of "VNI2" and "VLAN1" is mapped to VRF "148". In one example, there are two VRFs, having VLAN identifiers VLAN1 and VLAN2, associated with a first virtual switch, having an identifier of VNI1. Similarly, there is one VRF, also having a VLAN identifier of VLAN1, associated with a second virtual switch, having an identifier of VNI2. Forwarding table 156 allows traffic from the VRFs of the different virtual switches to be disambiguated on host (ESG) 160 of FIG. 1.

In some embodiments, forwarding table 156 is generated based on information sent from manager 170 via controller 180 to host (ESG) 160 of FIG. 1.

Figure 3:
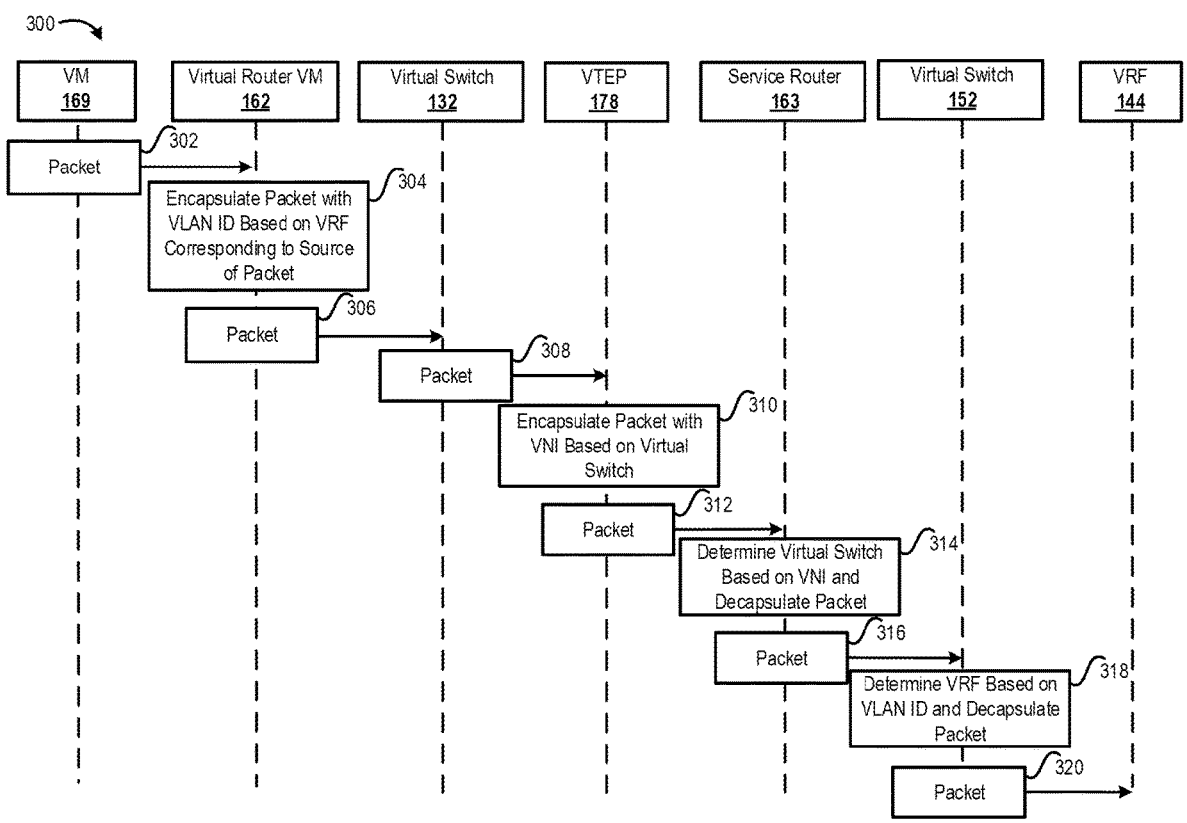
FIG. 3 depicts a block diagram of an example exchange of messages between network components, according to an embodiment.

FIG. 3 depicts an example 300 of an exchange of messages between network components. Example 300 includes VM 169, virtual router VM 162, virtual switch 132, VTEP 178, service router 163, virtual switch 152, and VRF 144 of FIG. 1.

At 302, VM 169 sends a packet to virtual router VM 162. In an example, VM 169 sets a destination IP address of the packet to an IP address of a destination in external network 190 of FIG. 1, and virtual switch 132 of FIG. 1 determines a next hop MAC address for the packet based on the destination IP address using forwarding tables, setting the next hop MAC address to a MAC address of virtual router VM 162.

At 304, virtual router VM 162 determines a VRF corresponding to the packet, such as based on a source IP address in the packet, which in this case is an IP address of VM 169, and adds a VLAN identifier to the packet based on the VRF. In an embodiment, virtual router VM 162 uses mapping information that maps source IP addresses to VRFs and VRFs to VLAN identifiers to perform the determination of the VRF and the adding of the VLAN identifier to the packet. In an example, virtual router VM 162 encapsulates the packet with an inner header that includes the VLAN identifier, while in an alternative embodiment, virtual router VM 162 modifies an existing inner header of the packet to include the VLAN identifier.

At 306, virtual router VM 162 sends the packet to virtual switch 132, which is a virtual switch that corresponds to virtual router VM 162.

At 308, virtual switch 132 sends the packet to VTEP 178, such as using a next hop MAC address.

At 310, VTEP 178 encapsulates the packet with a VNI based on the virtual switch from which the packet was received. For instance, VTEP 178 may encapsulate the packet with an outer header including the VNI of virtual switch 132. In one embodiment, VTEP 178 sets a destination IP address in the outer header to VTEP 167/host (ESG) 160 in order to route the packet from VTEP 178 to host (ESG) 160 of FIG. 1, where it is received by VTEP 167 of FIG. 1 and routed to service router 163.

At 312, VTEP 178 sends the packet to service router 163. In an example, VTEP 178 sends the packet to service router 163 because the packet needs to be transmitted by ESG VM 165 of FIG. 1 to its intended destination in external network 190.

At 314, service router 163 determines a virtual switch to which to send the packet based on the VNI (e.g., in the outer header of the packet, with which the packet was encapsulated at 310) of the packet. VTEP 167, which is associated with service router 163, may decapsulate the packet (e.g., by removing the outer header).

At 316, service router 163 sends the packet to virtual switch 152, which was identified as the virtual switch to which the packet was determined to be sent at 314, by setting a next hop MAC address for the packet.

At 318, virtual switch 152 determines a VRF of the packet based on the VLAN identifier (e.g., in the inner header of the packet, with which the packet was encapsulated at 304) of the packet and decapsulates the packet (e.g., by removing the inner header).

At 320, virtual switch 152 sends the packet to VRF 144, which was identified as the VRF corresponding to the packet at 318, by setting a next hop MAC address for the packet.

Figure 4:
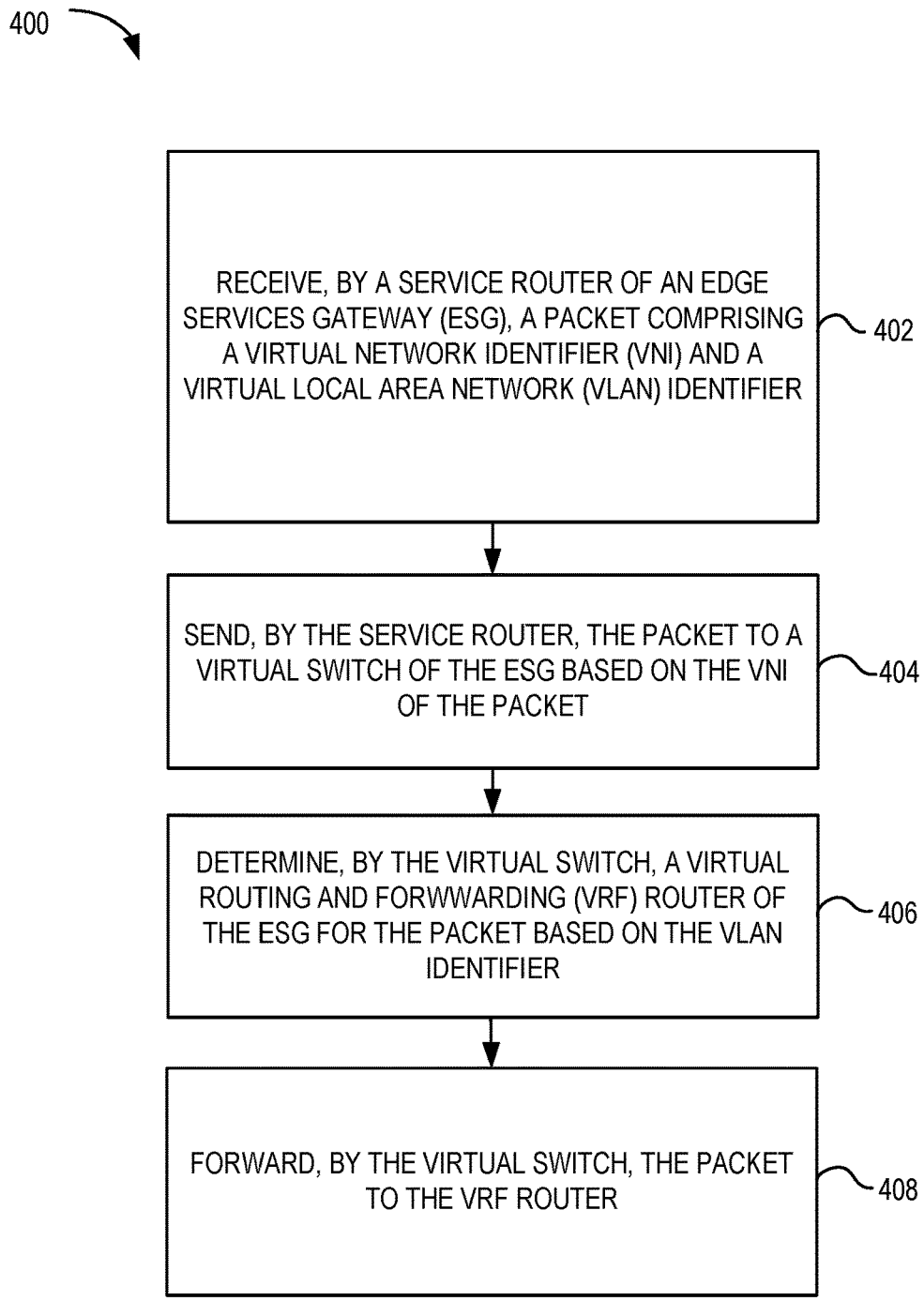
FIG. 4 depicts a flow diagram of a method for routing traffic in a network according to embodiments of the present disclosure.

FIG. 4 depicts a flow diagram of a method 400 for routing traffic in a network according to embodiments of the present disclosure. In an example, method 400 is performed by components of host (ESG) 160 of FIG. 1.

At step 402, a service router of an edge services gateway (ESG) receives a packet comprising a virtual network identifier (VNI) and a virtual local area network (VLAN) identifier. For example, the packet may have been sent by a VCI, such as VM 169 of FIG. 1, and may have been encapsulated with inner and outer headers including, respectively, the VLAN identifier and VNI by components of host 120 of FIG. 1. The VCI that sent the packet may be in a networking environment with multiple VRFs and multiple virtual switches.

At step 404, the service router sends the packet to a virtual switch of the ESG based on the VNI of the packet. For example, the service router may determine which given virtual switch of the ESG corresponds to the VNI in the outer header of the packet, and send the packet to the given virtual switch.

At step 406, the virtual switch determines a VRF router of the ESG for the packet based on the VLAN identifier. In certain embodiments, the virtual switch uses a forwarding table to determine a VRF that is mapped to the VNI and the VLAN identifier. For example, with respect to FIG. 2, if the VNI is "VNI1" and the VLAN identifier is "VLAN2", then the VRF identified is "146", which may be VRF 146 of FIG. 1. In an example, the forwarding table was generated based on information sent to the ESG by a management entity via a controller.

At step 408, the virtual switch forwards the packet to the VRF router. In an example, virtual switch 152 of FIG. 1 sends the packet to VRF 146 of ESG VM 165 of FIG. 1, which may then forward the packet to its intended destination in external network 190 of FIG. 1, such as via an uplink port.

In some embodiments, the packet comprises logical overlay traffic from a virtual computing instance (VCI).

In some embodiments, determining, by the virtual switch, the VRF router of the ESG for the packet based on the VLAN identifier comprises accessing a forwarding table that maps the VNI and the VLAN identifier to the VRF router.

Some embodiments further include receiving configuration information from a management entity, wherein the configuration table is generated based on the configuration information.

In certain embodiments, the virtual switch comprises a multiplexer.

In some embodiments, the packet comprises an inner header, and the inner header comprises the VLAN identifier.

In some embodiments, the packet comprises an outer header, and the outer header comprises the VNI.

It is noted that, while certain embodiments described herein involve outbound traffic to an external network, other embodiments involve inbound traffic from an external network. For example, host (ESG) 160 of FIG. 1 may receive traffic from external network 190 of FIG. 1 directed to an endpoint within network 100, such as VM 169 of FIG. 1. Techniques described herein may be applied to route the packet to its intended destination within network 100 of FIG. 1.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of routing traffic in a network, comprising:
   receiving, by a service router of an edge services gateway (ESG), a packet comprising:
   a virtual network identifier (VNI); and
   a virtual local area network (VLAN) identifier;
   sending, by the service router, the packet to a first virtual switch of a plurality of virtual switches of the ESG based on the VNI of the packet, wherein:
   the first virtual switch is associated with a plurality of virtual routing and forwarding (VRF) routers including a first VRF router corresponding to the VLAN identifier;
   the ESG comprises a second virtual switch associated with a different VNI; and
   the second virtual switch is associated with a second VRF router corresponding to the VLAN identifier;
   determining, by the first virtual switch, to forward the packet to the first VRF router of the plurality VRF routers based on the VLAN identifier; and
   forwarding, by the first virtual switch, the packet to the first VRF router.

2. The method of claim 1, wherein the packet comprises logical overlay traffic from a virtual computing instance (VCI).

3. The method of claim 1, wherein determining, by the first virtual switch, to forward the packet to the first VRF router based on the VLAN identifier comprises accessing a forwarding table that maps the VNI and the VLAN identifier to the first VRF router.

4. The method of claim 3, further comprising receiving configuration information from a management entity, wherein the forwarding table is generated based on the configuration information.

5. The method of claim 1, wherein the first VRF router forwards the packet to an uplink port associated with the ESG based on a destination internet protocol (IP) address of the packet.

6. The method of claim 1, wherein the packet comprises an inner header, and wherein the inner header comprises the VLAN identifier.

7. The method of claim 6, wherein the packet comprises an outer header, and wherein the outer header comprises the VNI.

8. A system comprising one or more processors and a non-transitory computer readable medium comprising instructions that, when executed by the one or more processors, cause the system to perform a method of routing traffic in a network, the method comprising:
   receiving, by a service router of an edge services gateway (ESG), a packet comprising:
   a virtual network identifier (VNI); and
   a virtual local area network (VLAN) identifier;
   sending, by the service router, the packet to a first virtual switch of a plurality of virtual switches of the ESG based on the VNI of the packet, wherein:
   the first virtual switch is associated with a plurality of virtual routing and forwarding (VRF) routers including a first VRF router corresponding to the VLAN identifier;
   the ESG comprises a second virtual switch associated with a different VNI; and
   the second virtual switch is associated with a second VRF router corresponding to the VLAN identifier;
   determining, by the first virtual switch, to forward the packet to the first VRF router of the plurality VRF routers based on the VLAN identifier; and
   forwarding, by the first virtual switch, the packet to the first VRF router.

9. The system of claim 8, wherein the packet comprises logical overlay traffic from a virtual computing instance (VCI).

10. The system of claim 8, wherein determining, by the first virtual switch, to forward the packet to the first VRF router based on the VLAN identifier comprises accessing a forwarding table that maps the VNI and the VLAN identifier to the first VRF router.

11. The system of claim 10, wherein the method further comprises receiving configuration information from a management entity, wherein the forwarding table is generated based on the configuration information.

12. The system of claim 8, wherein the first VRF router forwards the packet to an uplink port associated with the ESG based on a destination internet protocol (IP) address of the packet.

13. The system of claim 8, wherein the packet comprises an inner header, and wherein the inner header comprises the VLAN identifier.

14. The system of claim 13, wherein the packet comprises an outer header, and wherein the outer header comprises the VNI.

15. A non-transitory computer readable medium comprising instructions that, when executed by one or more processors of a computer system, cause the computer system to perform a method of routing traffic in a network, the method comprising:
   receiving, by a service router of an edge services gateway (ESG), a packet comprising:
   a virtual network identifier (VNI); and
   a virtual local area network (VLAN) identifier;

sending, by the service router, the packet to a first virtual switch of a plurality of virtual switches of the ESG based on the VNI of the packet, wherein:
    the first virtual switch is associated with a plurality of virtual routing and forwarding (VRF) routers including a first VRF router corresponding to the VLAN identifier;
    the ESG comprises a second virtual switch associated with a different VNI; and
    the second virtual switch is associated with a second VRF router corresponding to the VLAN identifier;
determining, by the first virtual switch, to forward the packet to the first VRF router of the plurality VRF routers based on the VLAN identifier; and
forwarding, by the first virtual switch, the packet to the first VRF router.

16. The non-transitory computer readable medium of claim 15, wherein the packet comprises logical overlay traffic from a virtual computing instance (VCI).

17. The non-transitory computer readable medium of claim 15, wherein determining, by the first virtual switch, to forward the packet to the first VRF router based on the VLAN identifier comprises accessing a forwarding table that maps the VNI and the VLAN identifier to the first VRF router.

18. The non-transitory computer readable medium of claim 17, wherein the method further comprises receiving configuration information from a management entity, wherein the forwarding table is generated based on the configuration information.

19. The non-transitory computer readable medium of claim 15, wherein the first VRF router forwards the packet to an uplink port associated with the ESG based on a destination internet protocol (IP) address of the packet.

20. The non-transitory computer readable medium of claim 15, wherein the packet comprises an inner header, and wherein the inner header comprises the VLAN identifier.

\* \* \* \* \*